US007365643B1

(12) United States Patent
Cole

(10) Patent No.: US 7,365,643 B1
(45) Date of Patent: Apr. 29, 2008

(54) PREVENTING REMOVAL OF PERSONS WITHOUT AN APPROVED ESCORT

(75) Inventor: Kelley D. Cole, Lindenwold, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 217 days.

(21) Appl. No.: 11/282,908

(22) Filed: Nov. 18, 2005

(51) Int. Cl.
*G08B 1/08* (2006.01)
*H04Q 7/00* (2006.01)

(52) U.S. Cl. .............................. 340/539.11; 340/573.1; 340/572.1

(58) Field of Classification Search ........... 340/539.11, 340/573.1, 573.4, 572.1, 5.7; 235/375, 492
See application file for complete search history.

(56) References Cited

U.S. PATENT DOCUMENTS

| | | | | |
|---|---|---|---|---|
| 4,006,459 | A * | 2/1977 | Baker et al. | 340/5.6 |
| 4,853,692 | A * | 8/1989 | Wolk et al. | 340/573.1 |
| 5,978,493 | A * | 11/1999 | Kravitz et al. | 283/75 |
| 6,873,260 | B2 * | 3/2005 | Lancos et al. | 340/573.1 |
| 7,164,354 | B1 * | 1/2007 | Panzer | 340/572.1 |

* cited by examiner

*Primary Examiner*—John Tweel, Jr.
(74) *Attorney, Agent, or Firm*—Duane Morris, LLP

(57) ABSTRACT

A method for preventing the egress of a protected person (child) from a given region without an approved escort provides each child with an identifying RFID tag, and each approved person with an identifying RFID tag. A lock region is defined and scanned by a computer-based system which compares the RFID tag of the child within the lock region with a list of approved escorts, and maintains the lock region closed unless the child is accompanied by one of the approved escorts.

5 Claims, 2 Drawing Sheets

PREVENTING REMOVAL OF PERSONS WITHOUT AN APPROVED ESCORT

FIELD OF THE INVENTION

This invention relates to methods for providing controls tending to prevent kidnapping or unauthorized removal of infants or children from a given location.

BACKGROUND OF THE INVENTION

Much attention has been paid of late to the problem of kidnapping or unauthorized removal of children from their schools. Many schools currently use a sign-in and/or a sign/out sheet to document the taking of children from the custody of the school, and may rely on memory to identify the persons who remove children.

There have been proposals to identify children by the use of radio-frequency identification (RFID) tags, but these may not meet the needs of infant and child caregivers.

Improved or alternative arrangements or methods for control of the release of children from a controlled environment is desired.

SUMMARY OF THE INVENTION

A method according to an aspect of the invention is for preventing a protected person, such as a minor child, from leaving a building unless accompanied by an approved companion for that protected person. The method comprises the steps of providing each protected person with a radio-frequency identification tag, and providing each approved companion with a radio-frequency identification tag. A lock region is provided between the interior of the building and the outside world. The lock region has a first door opening into the interior of the building and a second door opening to the outside world. According to an aspect of the invention, a computer control or arrangement is used to determine if the RFID tag of a protected person is within the lock region. The protected person is deemed to be within the lock region if his RFID tag is present. Using the computer, a determination is made as to whether the RFID tag of an approved companion associated with the protected person is also within the lock region. The approved companion is deemed to be within the lock region if his RFID tag is present. If a protected person is within the lock region without a person approved as to the protected person, the second door is maintained locked.

A particular mode of the method includes the step of, if the protected person is within the lock region with an approved companion as to the protected person, locking the first door and unlocking the second door.

DESCRIPTION OF THE INVENTION

Figure 1:
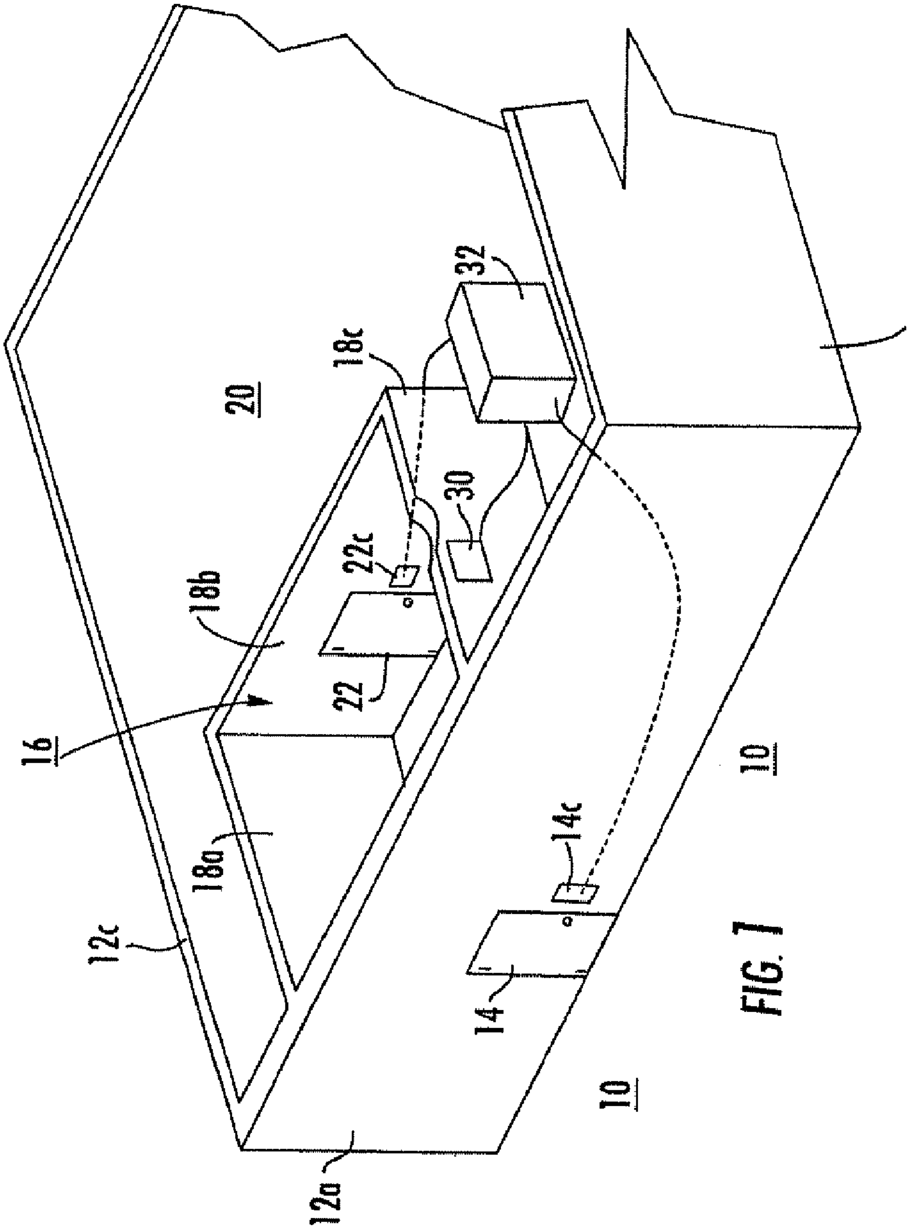
FIG. 1 is a simplified perspective or isometric view, partially cut away, of a building with a lock region according to an aspect of the invention.
Figure 3:
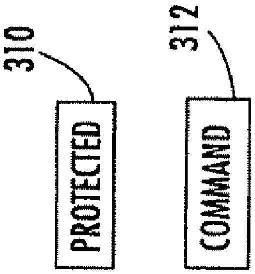
FIG. 3 is a schematic representation of first and second RFID tags for use by a protected person and a companion, respectively.

In FIG. 1, a protected building 10 defines protective peripheral walls 12*a*, 12*b*, 12*c*, . . . which are assumed to prevent unwanted ingress and egress. An exterior door 14 provides access to the interior of building 10. Door 14 has a controllable latch or lock 14*c*, which is remotely controllable to allow locking of door 14 so that it cannot be opened. Exterior door 14 opens into a lock region designated generally as 16, defined by a portion of exterior wall 12*a*, and by further walls 18*a*, 18*b*, and 18*c*. A person entering lock region 16 may enter the main portion 20 of building 10 by way of an interior door 22, the latch of which is controllable by way of a control unit 22*c*.

The building 10 of FIG. 1 is used by persons protected by the arrangement according to the invention. More particularly, if the protected persons are minors or children, or infirm, as for example patients suffering from Alzheimer's disease, it may be desirable to assure that they do not leave the premises unless accompanied by a responsible or approved person, such as a parent in the case of a minor child.

According to an aspect of the invention, minors or other protected persons are provided with individualized radio-frequency identification (RFID) tags, which are remotely readable and which serve to identify the tag bearer. Each approved companion person, such as a child or other approved relative or caregiver, is also provided with a suitable identifying RFID tag.

In FIG. 1, wall 18*c* of the lock region 16 is fitted with a radio-frequency scanner 30 suited to scanning those RFID tags which are within the lock region, and reporting the sensed information to a computer control arrangement illustrated as a block 32.

Door 14 of FIG. 1 is normally locked as to egress from lock region 16. The presence of the RFID tag of a protected person within lock region 16 has no effect, and door 14 remains locked as to that protected person, preventing their egress. The sensed presence of the RFID tag of another person, without the presence of a protected person, causes the control arrangement 32 to unlock door 14, so that the party can exit the building. The sensed presence of the RFID tag of a protected person with the presence of a third party who is not the approved companion is insufficient to unlock door 14, so that the protected person cannot exit with the "unapproved" companion or third party. Only the presence of the RFID tag of a companion approved for the RFID tag of the protected person allows the door 14 to be unlocked for egress of the protected party.

The control may be arranged so that door 14 cannot be unlocked unless door 22 is closed, and likewise so that door 22 cannot be unlocked unless door 14 is closed.

Figure 2:
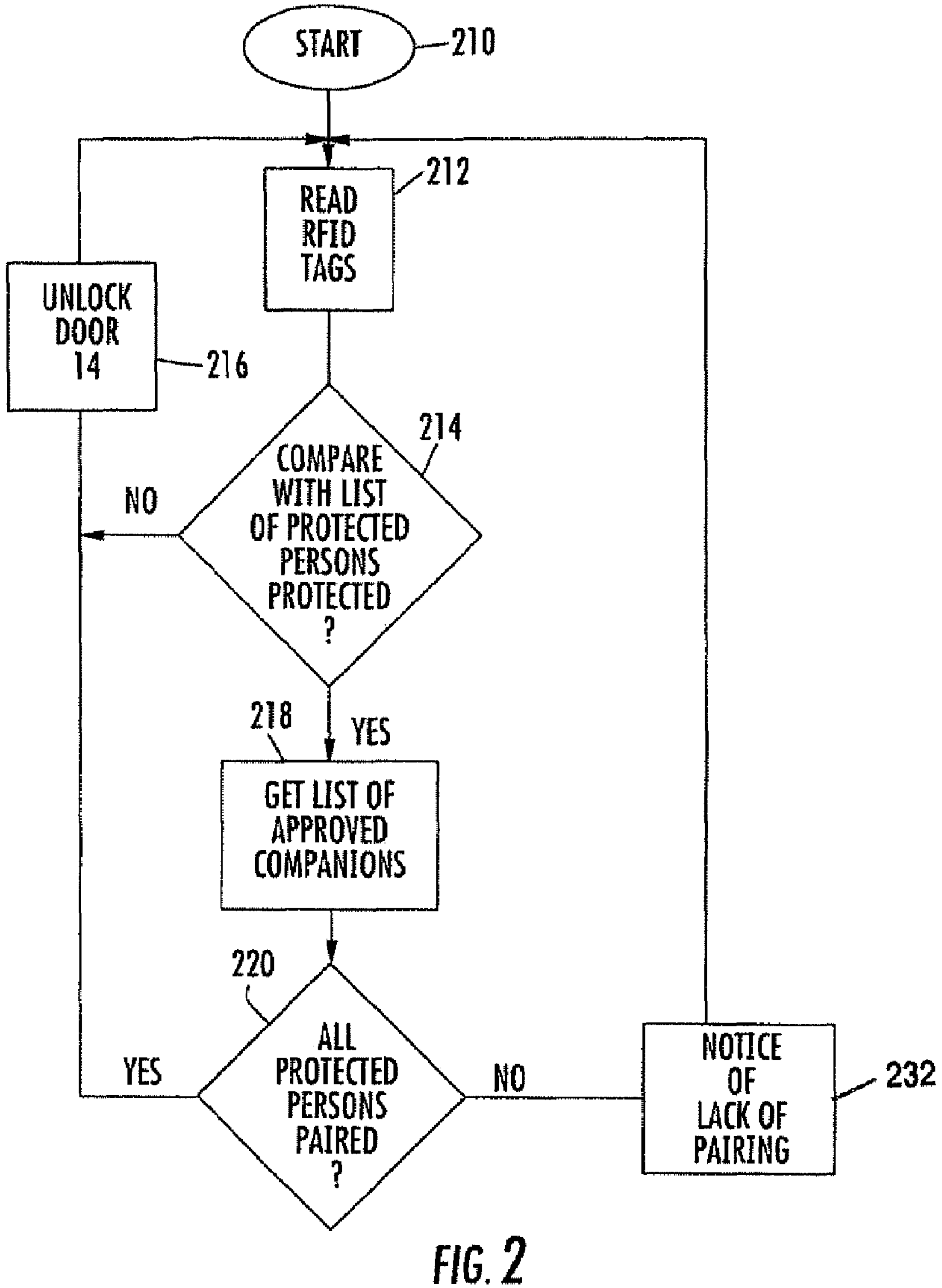
FIG. 2 is a simplified logic flow chart or diagram illustrating a possible control method according to an aspect of the invention.

FIG. 2 is a simplified flow chart or diagram of one form which the logic of control arrangement 32 can take. In FIG. 2, the logic starts at a START block 210, and proceeds to a block 212, which represents reading the RFID tags present within lock region 16. The identities associated with the observed tags are evaluated in a decision block 214 to determine if any of them represent protected persons. If there are no protected persons within lock region 16, the logic leaves decision block 214 by the NO output, and proceeds to a block 216, which represents unlocking exterior door 14 so that the persons in lock region 16 can exit. From block 214, the logic returns to block 212, to again read the RFID tags within lock region 16. On the other hand, if one or more protected persons is/are identified as being within lock region 16, the logic leaves decision block 214 by way of the YES output, and proceeds to a block 218, which represents entry into a memory preloaded with protected parties as addresses, and which produces a list of all the approved companions for that protected party. Block 218 thus represents the accessing of one or more approved companions for the protected parties within lock region 16. The logic then flows to a further decision block 220 which, for each protected party within lock region 16, iterates through the list of approved companions for that/those protected persons, and determines the presence or absence of an approved companion for each protected person. This may be termed "pairing." The logic leaves decision block 220 by the YES output if there is an approved companion for each protected person within lock region 16, and the logic can then return to logic block 216, representing unlocking of door 14. The logic returns from block 216 to block 212, to again begin reading RFID tags. On the other hand, if a protected person is present in lock region 16 without an approved companion, the logic flows from the NO output of block 220 to a block 232 and back to block 212. Block 232 represents notification that an improperly accompanied protected person is within the lock region, and that they should return through door 22 to obtain proper accompaniment.

Of course, the flow of the logic can be arranged to keep an electronic record of such matters as the time at which a protected person leaves, which approved party accompanied the protected person, and other matters.

A method according to an aspect of the invention is for preventing a protected person, such as a minor child, from leaving a building (10) unless accompanied by an approved companion for that protected person. The method comprises the steps of providing each protected person with a radio-frequency identification tag (310), and providing each approved companion with a radio-frequency identification tag (312). A lock region (16) is provided between the interior (20) of the building (10) and the outside world. The lock region (16) has a first door (22) opening into the interior (20) of the building (10) and a second door (14) opening to the outside world. According to an aspect of the invention, a computer control or arrangement (30,32) is used to determine if the RFID tag (310) of a protected person is within the lock region (16). The protected person is deemed to be within the lock region (16) if his RFID tag (310) is present. Using the computer (32), a determination is made as to whether the RFID tag (312) of an approved companion associated with the protected person is also within the lock region (16). The approved companion is deemed to be within the lock region (16) if his RFID tag (312) is present. If a protected person is within the lock region (16) without a person approved as to the protected person, the second door (14) is maintained locked.

A particular mode of the method includes the step of, if the protected person is within the lock region (16) with an approved companion as to the protected person, locking the first door (22) and unlocking the second door (14).

What is claimed is:

1. A method for allowing egress of a first person from a facility only when that first person is accompanied by an authorized second person, said method comprising the steps of:

providing said first person with an individual first radio-frequency identification (RFID) tag; and providing said second person with an individual second RFID tag;

when said first person bearing said individual first RFID tag is within a controlled region, allowing egress from said controlled region of said first person bearing said individual first RFID tag only when accompanied by said second person bearing said individual second RFID tag; and when said second person is within the controlled region allowing egress from said controlled region of said second person regardless of whether said second person is with said first person.

2. A method for preventing a child from leaving a building unless accompanied by an approved person, said method comprising the steps of:

providing a child with a radio-frequency identification (RFID) tag;

providing an approved person with an RFID tag;

providing a lock region between said building and the outside world, said lock region having a first door opening into the interior of said building and a second door opening to the outside world;

scanning said lock region;

using a computer, determining if the RFID tag of said child is within the lock region;

using said computer, determining if said approved person associated with said child is also within said lock region;

if said child is within said lock region without said approved a person, maintaining said second door locked;

if said child is within said lock region with said approved person, locking said first door and unlocking said second door; and if said approved person is within said lock region without said child, unlocking said first door.

3. A method for preventing a protected person from leaving a building unless accompanied by an approved companion for that protected person, said method comprising the steps of:

providing a protected person with a first radio-frequency identification (RFID) tag;

providing an approved companion with a second RFID tag;

providing a lock region between said building and the outside world, said lock region having a first door opening into the interior of said building and a second door opening to the outside world;

using a computer, determining if the RFID tag of the protected person is within the lock region, and deeming the protected person to be within the lock region if the first RFID tag is present;

using said computer, determining if the second RFID tag is also within said lock region, and deeming said approved companion to be within the lock region if the second RFID tag is present;

if the protected person is within said lock region without the approved person person, maintaining said second door locked; and if the approved person is within said lock region without said protected person, unlocking said second door.

4. A method according to claim 3, further comprising the step of, if said protected person is within said lock region with said approved person, locking said first door and unlocking said second door.

5. A method according to claim 3, wherein said protected person is a child or infant.

* * * * *